Figure 1:
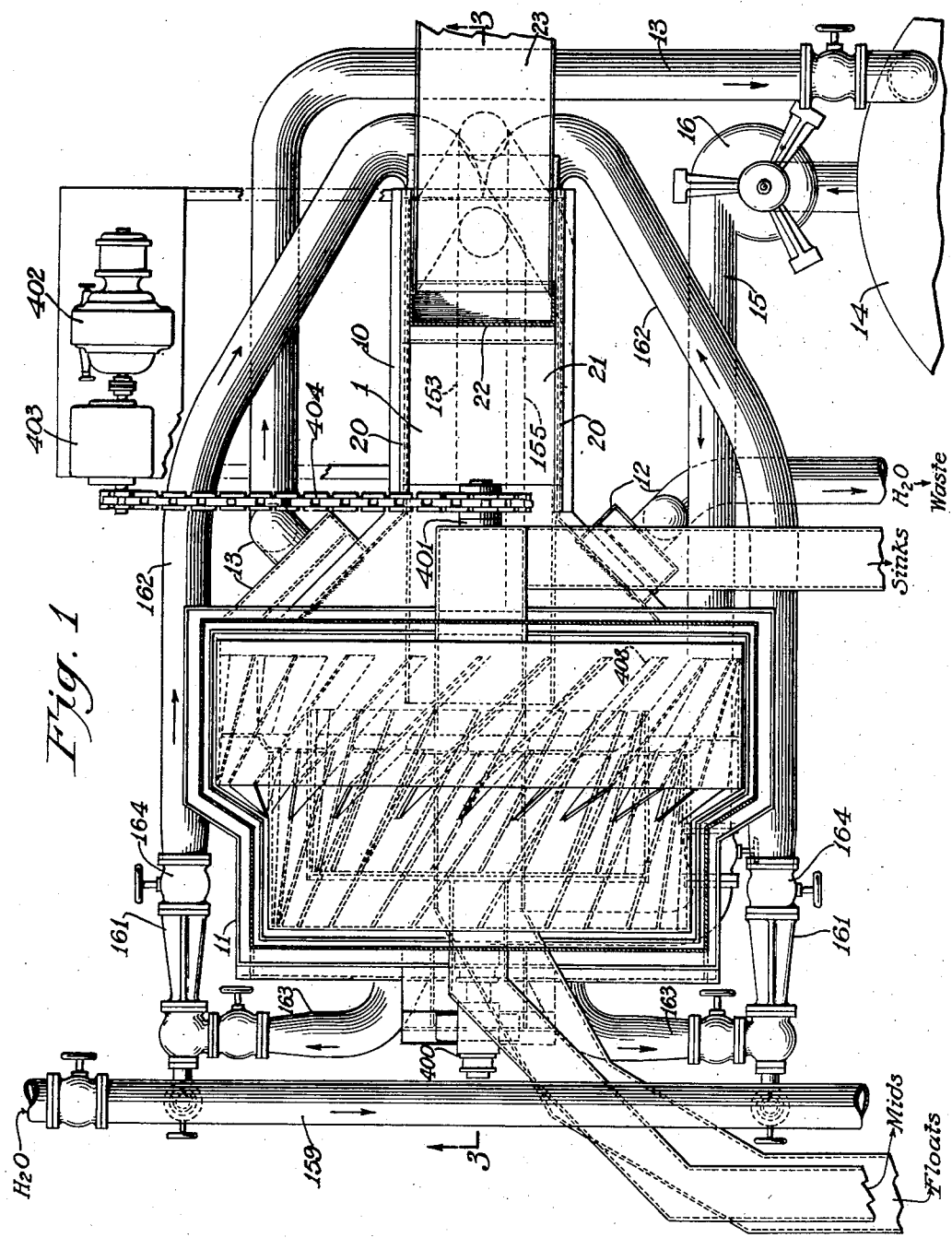

March 21, 1939.  F. E. SMITH  2,150,946
CLASSIFICATION SYSTEM
Filed Jan. 21, 1937  8 Sheets-Sheet 1

Frank E. Smith INVENTOR

Frank E. Smith INVENTOR

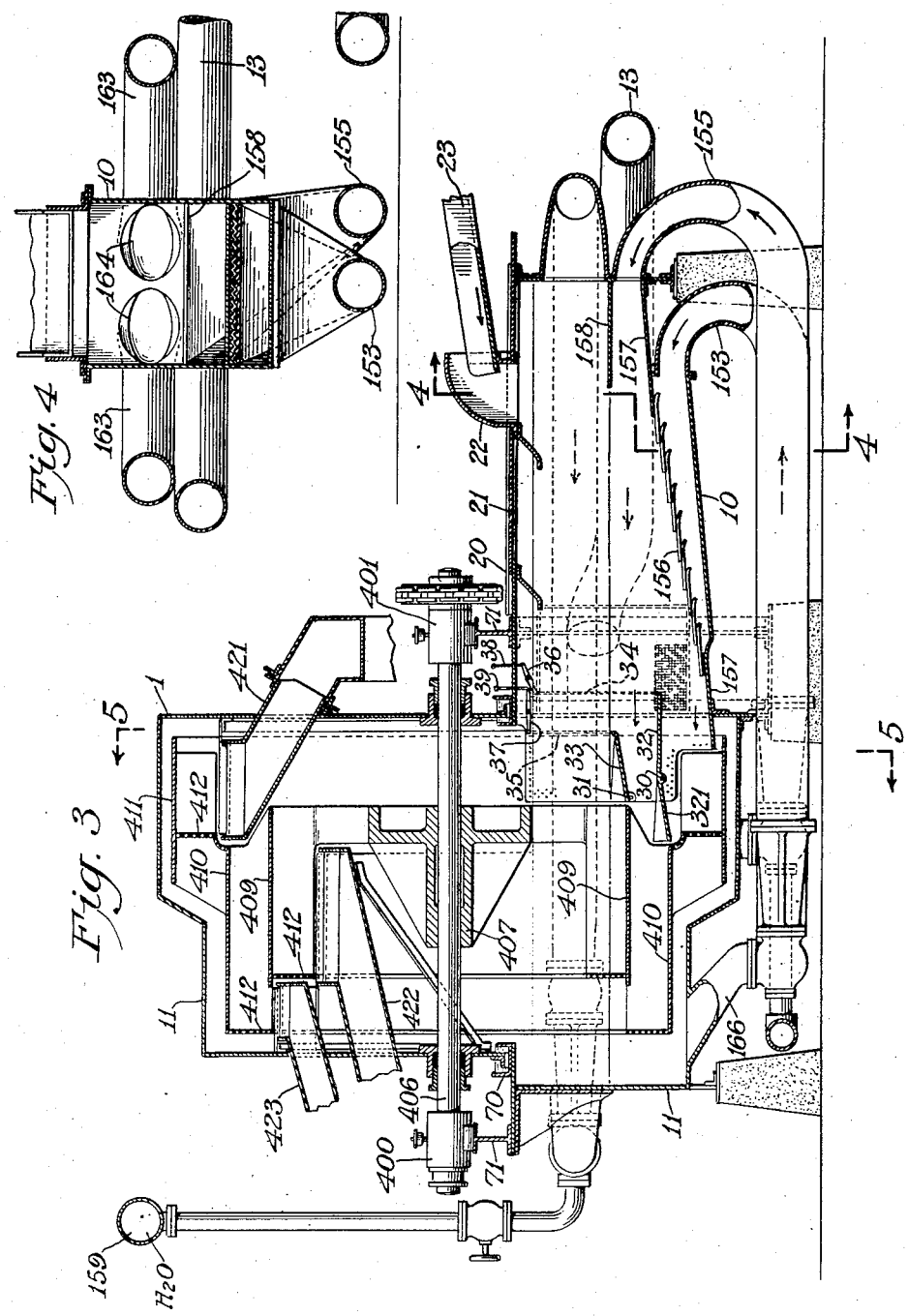

March 21, 1939.　　　F. E. SMITH　　　2,150,946
CLASSIFICATION SYSTEM
Filed Jan. 21, 1937　　　8 Sheets-Sheet 4

Frank E. Smith
INVENTOR.
John L. Seymour
ATTORNEY.

March 21, 1939. F. E. SMITH 2,150,946
CLASSIFICATION SYSTEM
Filed Jan. 21, 1937 8 Sheets-Sheet 5
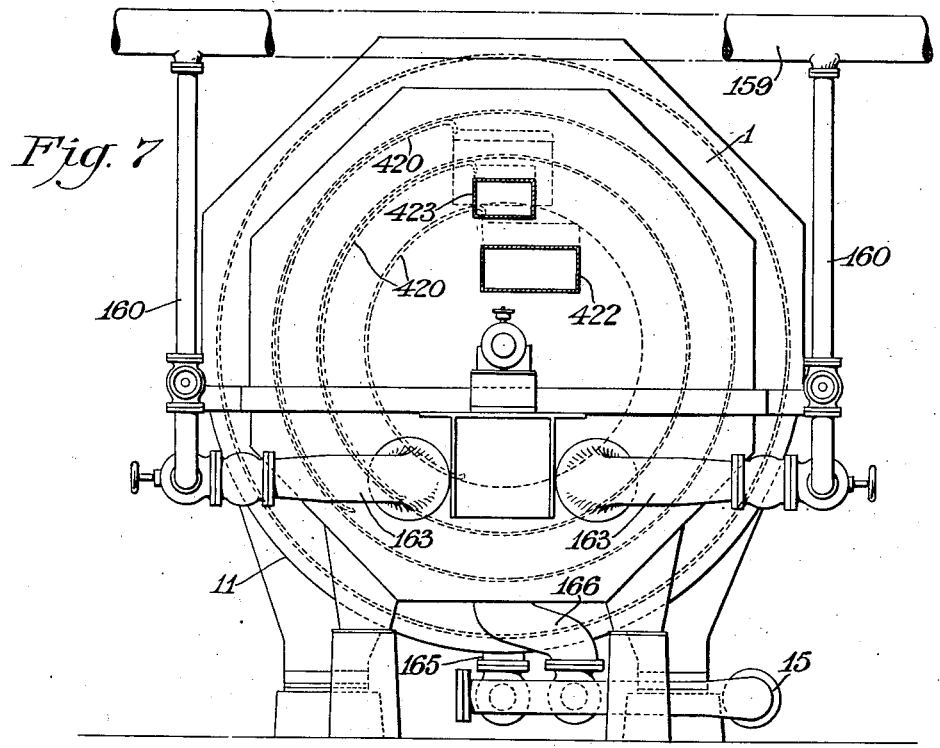
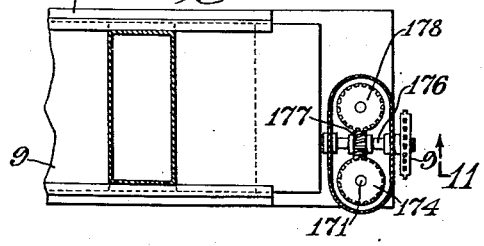
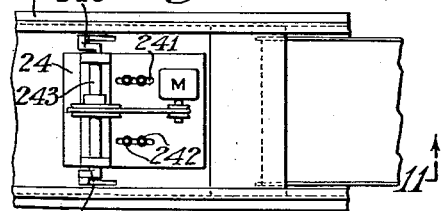
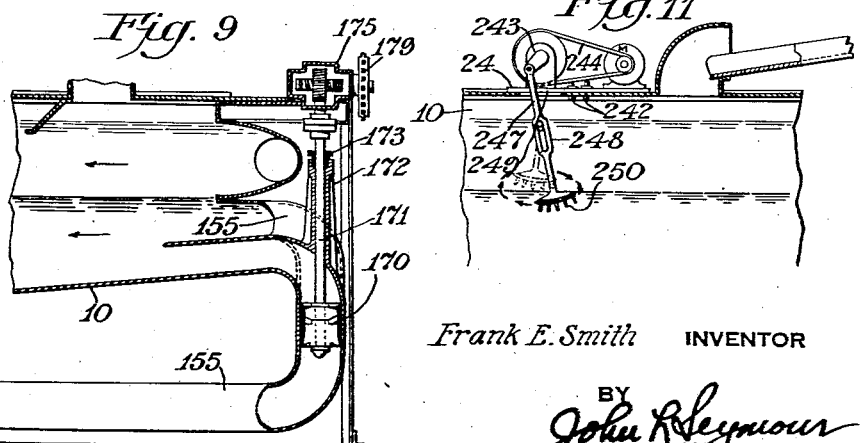
Frank E. Smith INVENTOR
BY John R. Seymour
ATTORNEY March 21, 1939.　　　F. E. SMITH　　　2,150,946
CLASSIFICATION SYSTEM
Filed Jan. 21, 1937　　　8 Sheets-Sheet 6
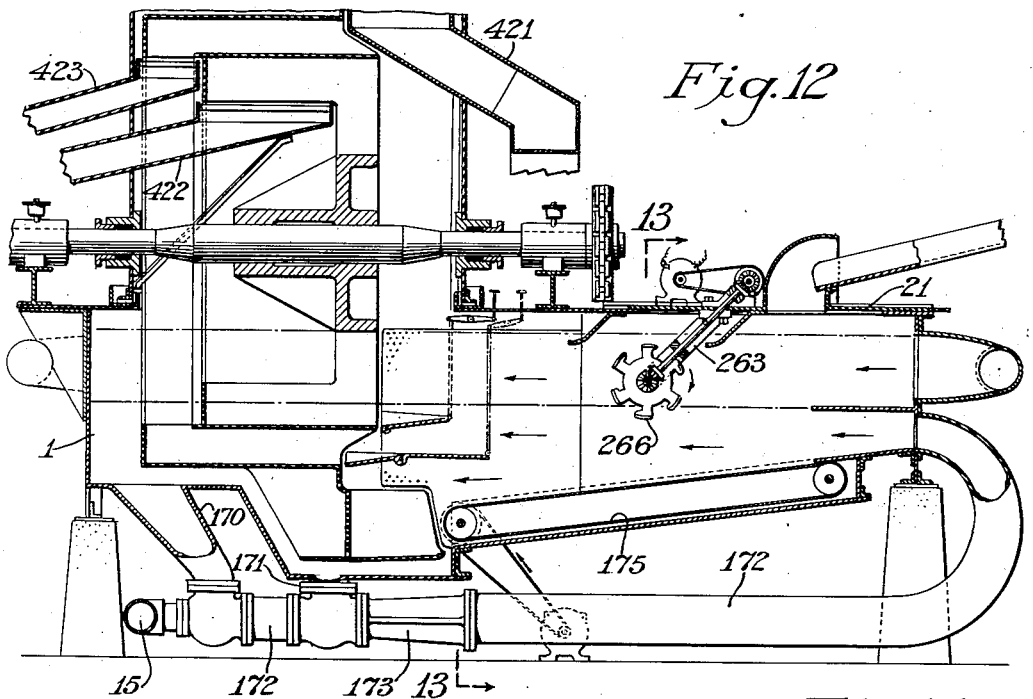
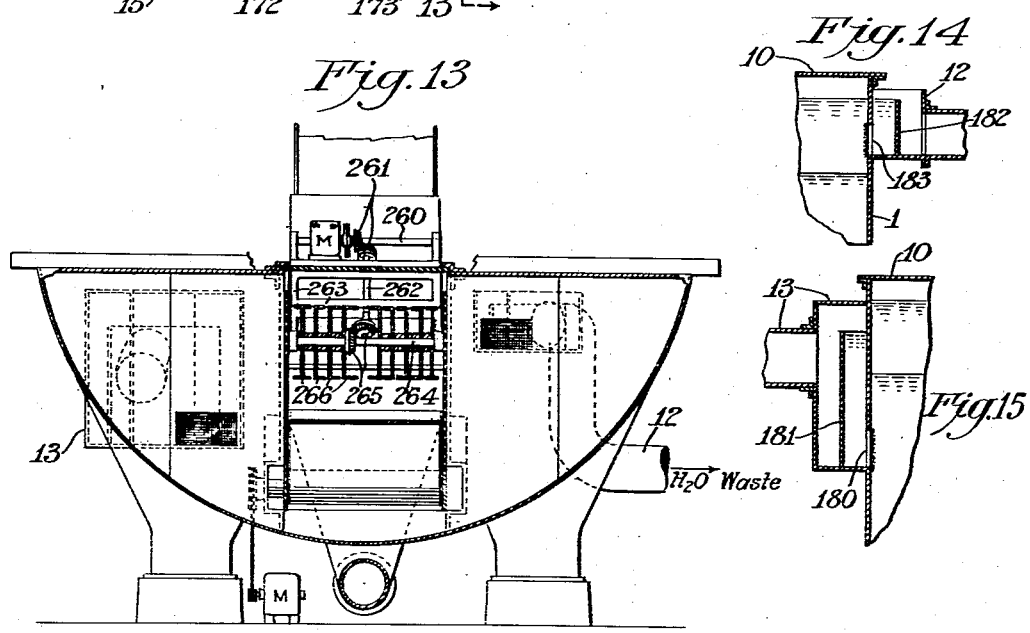
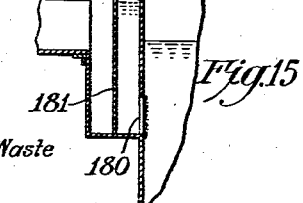
Frank E. Smith INVENTOR
BY
John R. Seymour
ATTORNEY March 21, 1939.  F. E. SMITH  2,150,946
CLASSIFICATION SYSTEM
Filed Jan. 21, 1937  8 Sheets-Sheet 7
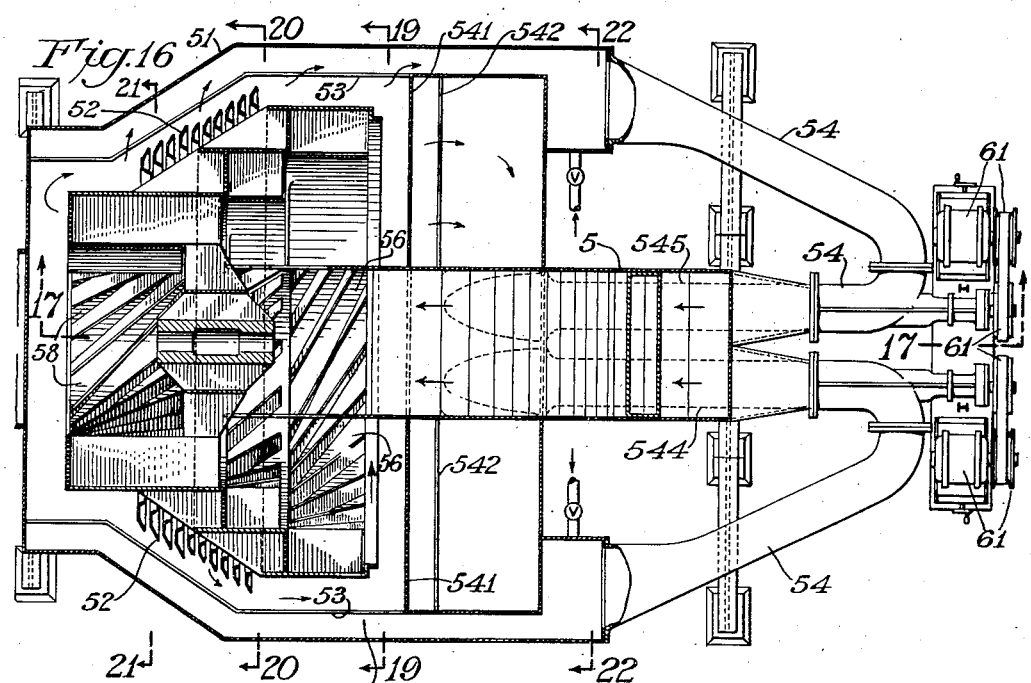
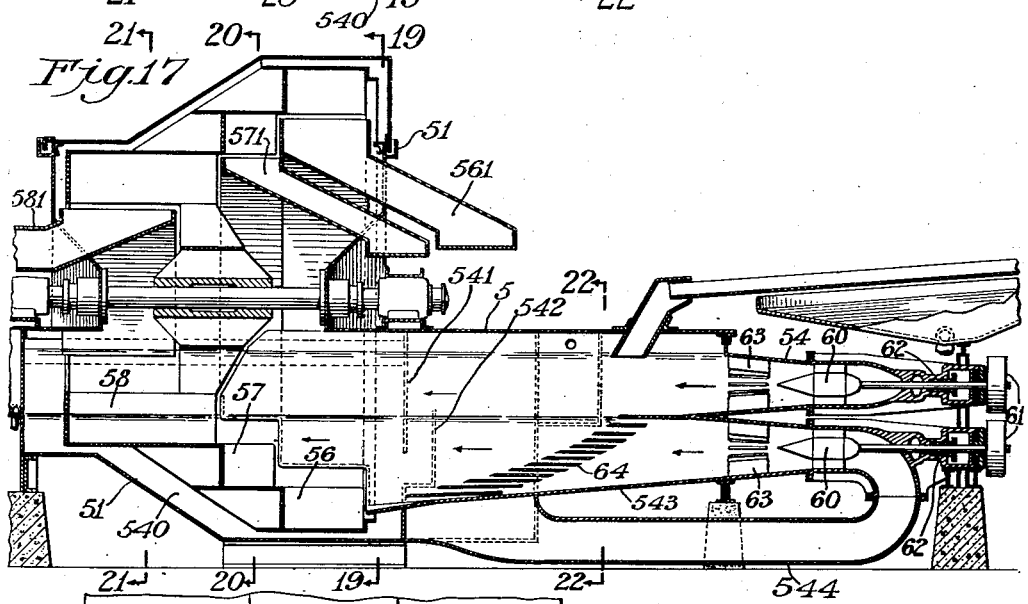
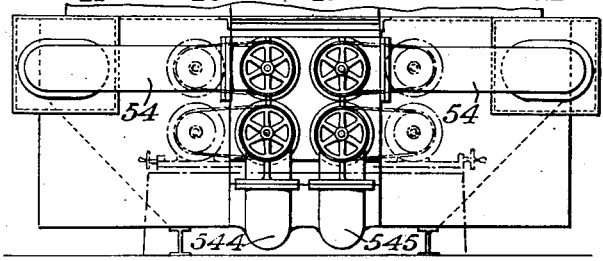
Frank E. Smith
INVENTOR
John Seymour
ATTORNEY March 21, 1939.　　　F. E. SMITH　　　2,150,946
CLASSIFICATION SYSTEM
Filed Jan. 21, 1937　　　8 Sheets-Sheet 8
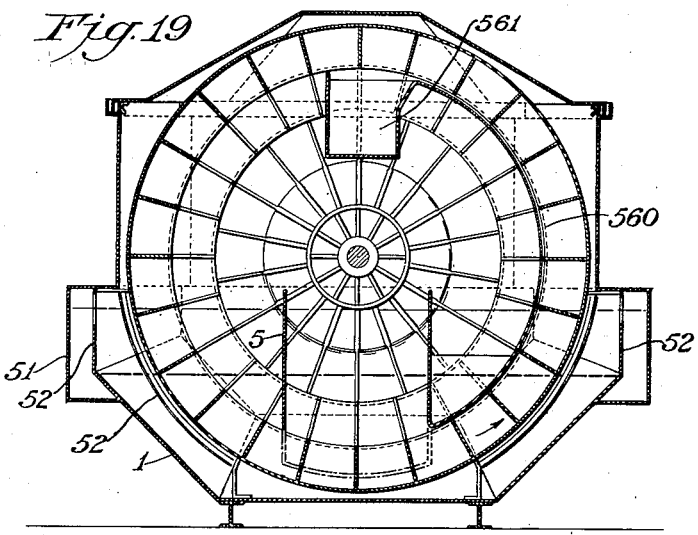
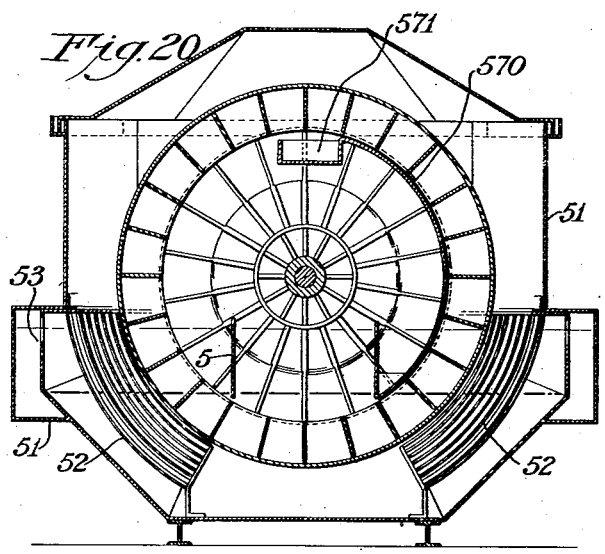
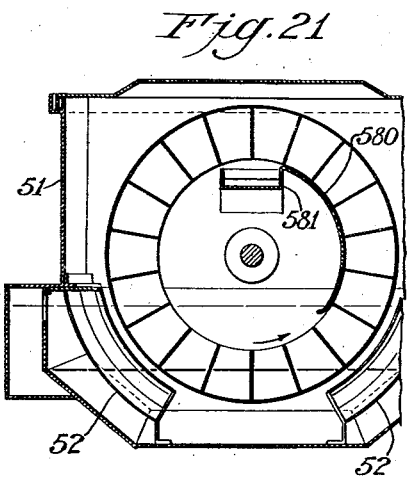
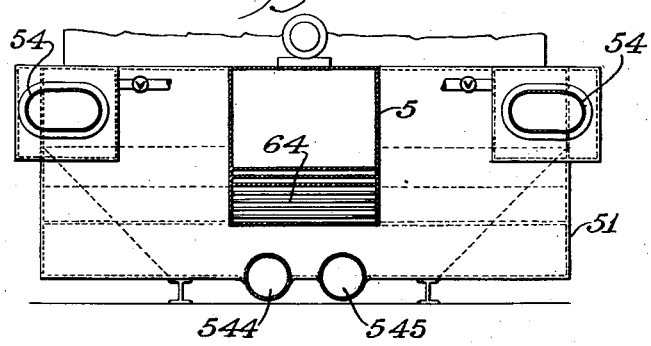
Frank E. Smith
INVENTOR Patented Mar. 21, 1939

2,150,946

UNITED STATES PATENT OFFICE 2,150,946

CLASSIFICATION SYSTEM

Frank E. Smith, Wilmington, Del., assignor to E. I. du Pont de Nemours & Company, Wilmington, Del., a corporation of Delaware Application January 21, 1937, Serial No. 121,401

16 Claims. (Cl. 209—172)

A. This invention relates to the separation of solids of different specific gravities by the use of a liquid of intermediate specific gravity. The invention has particular application to the separation of coal from its indigenous impurities and it will be described in that connection, but that particular description is illustrative, not limiting.

B. In copending application, Alexander et al., filed August 31, 1936, Serial No. 98,818, there is described a new process and a new apparatus for carrying out the separation of materials of different specific gravities. In that invention coal is wetted with an aqueous solution containing a proportion of an active agent, an example of which is tannic acid, and is immersed in a separating fluid of specific gravity intermediate the specific gravities of the coal and the impurities. The classified materials are removed separately from the apparatus and the washing fluid is treated in a particular, inventive manner for the recovery of the parting liquid.

C. It is an object of this invention to separate coal from slate and other minerals from impurities by an improved process. Another object of the invention is to carry out the improved process or the process described in said earlier filed application by an improved apparatus. Other objects of the invention will be in part elsewhere herein described and in part apparent.

D. The objects of the invention are accomplished, generally speaking, by subjecting the materials to be separated to the horizontal classifying action of a moving stream of light liquid, such as water, and thereafter subjecting the so-classified materials to the vertical classifying action of a moving stream of liquid of specific gravity intermediate the specific gravities of the materials to be separated, and by utilizing the moving liquids for the transportation of the solids. The objects of the invention are also accomplished to a degree by the apparatus more fully hereinafter described.

Figure 2:
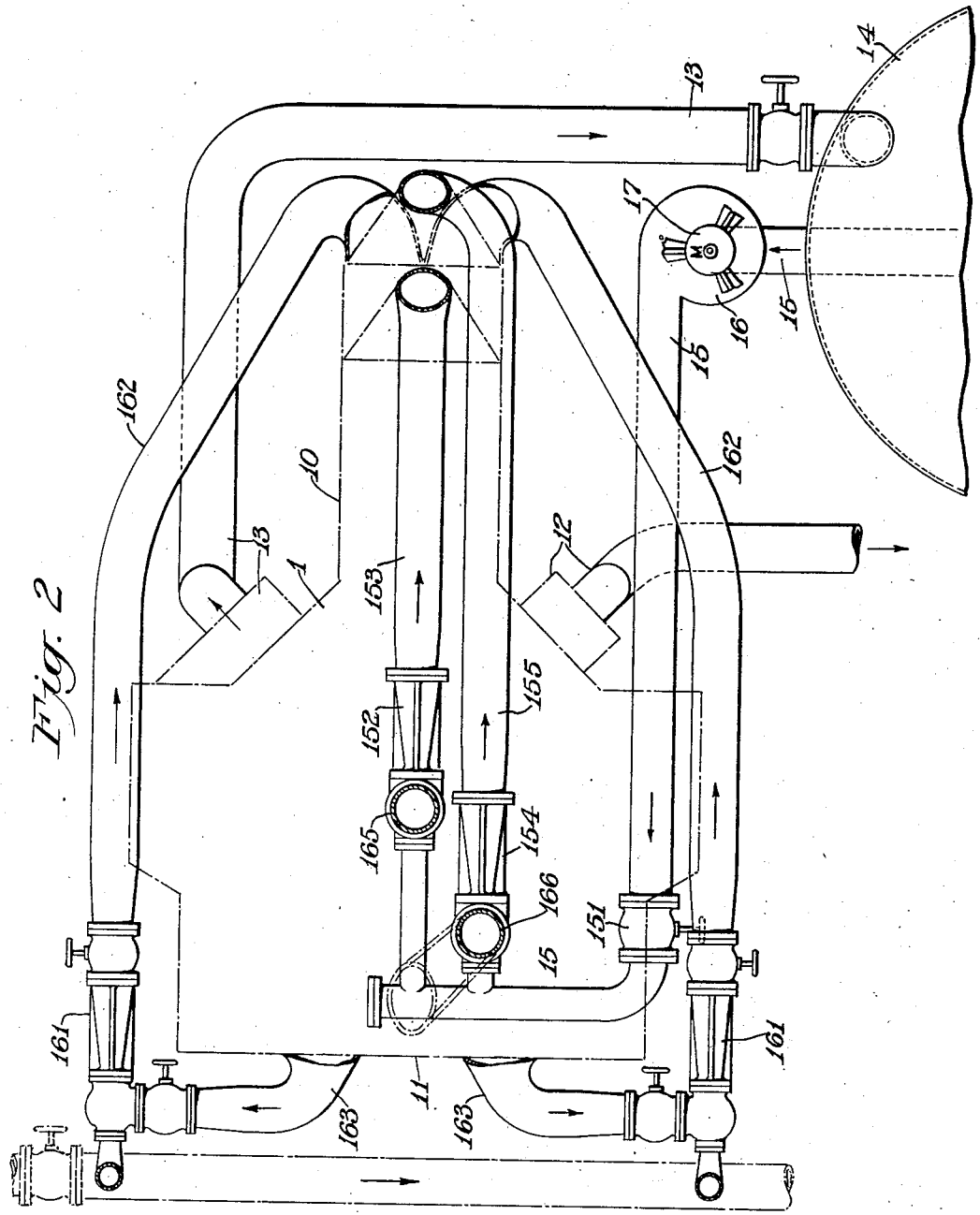
Figure 5:
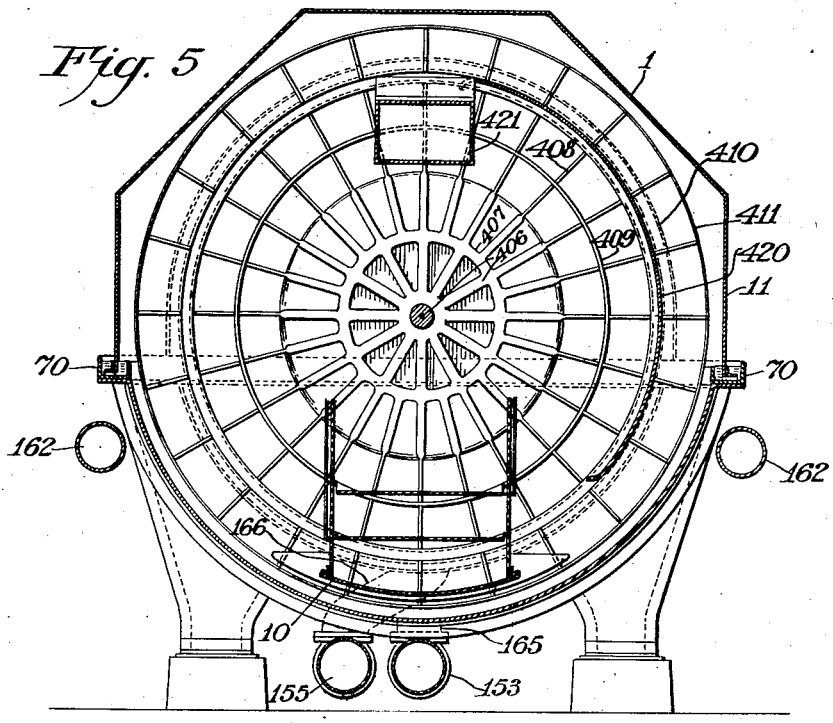
Figure 6:
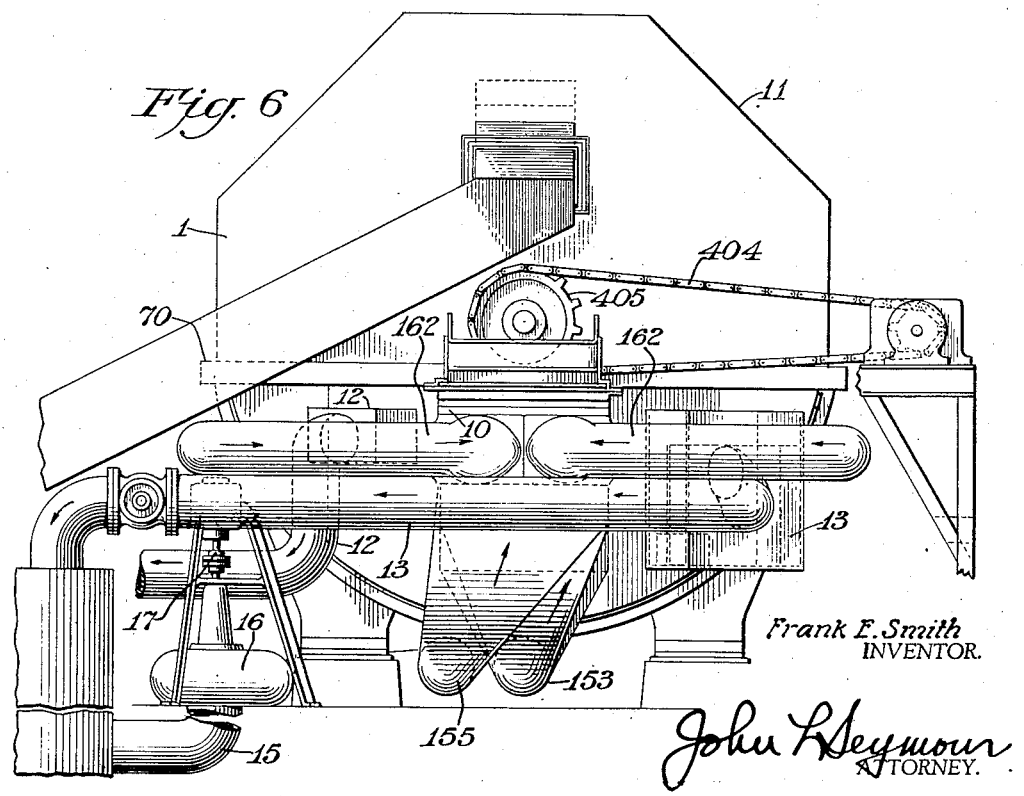

E. In the drawings, Figure 1 is a plan view partly in section of the new apparatus; Figure 2 is a piping diagram in plan; Figure 3 is a vertical section on the line 3—3 of Figure 1; Figure 4 is a vertical section on the line 4—4; Figure 5 is a section on the line 5—5 of Figure 3; Figure 6 is an elevation of the loading end of the machine; Figure 7 is an elevation of the discharge end of the machine partly in section; Figures 8 and 9 are plan and vertical sections of one type of pump for securing the circulation of the liquid; Figures 10 and 11 are plan and vertical sections, respectively, of a device to prevent rafting; Figure 12 is a vertical section of a modified form of the machine; Figure 13 is a section on the line 13—13 of Figure 12; Figure 14 is a detail of the means for maintaining the level of the light liquid; Figure 15 is a detail of the method of maintaining the level of the heavy liquid; Figure 16 is a plan view of a modified form of machine partly in section; Figure 17 is a section on the line 17—17 of Figure 16 with the parts dissectioned and 16 restored; Figure 18 is a view from the charging end of the apparatus of Figures 16 and 17; Figure 19 is a section on the line 19—19 of Figure 16; Figure 20 is a section on the line 20—20 of Figure 16; Figure 21 is a section on line 21—21 of Figure 16; Figure 22 is a section on the line 22—22 of Figure 17.

F. Referring to the numerals in the drawings, 1 is a tank; 10 is a channel section of the tank; 11 is the wheel section of the tank; 12 is a weir box and discharge pipe which regulate the level of water in the system; 13 is a weir box and overflow pipe which regulate the level of the heavy liquid; 14 is a storage tank for heavy liquid; 15 is a pipe for conducting heavy liquid from the tank 14 to the apparatus; 16 is a pump to assist the flow; 17 is a motor to drive the pump 16; 151 is a valve in the pipe 15 to control the addition of heavy liquid to the system; 152 is an eductor utilizing the pressure from pipe 15 to increase the velocity of the fluid in pipe 153; 154 is an eductor also utilizing fluid under pressure from the pipe 15; 155 is a pipe; 156 is the perforated bottom of the channel; 157 is an imperforate bottom of the channel; 158 is a plate member extending transversely of the channel member for a portion of its length and dividing the channel into an upper and a lower section; 159 is a water supply header; 160—160 are supply pipes leading down therefrom; 161—161 are eductors; 162—162 are pipes leading from the eductors; 163—163 are pipes leading from the discharge side of the apparatus to the eductors; 164—164 are gate valves in the pipes 163; 165 is a pipe discharging heavy liquid from the tank to the pipe 15 short of the eductor 152; 166 is a pipe discharging heavy liquid from the discharge end of the apparatus to the pipe 15 short of the eductor 154.

G. The operation of the apparatus to this point is as follows: The apparatus is filled with heavy liquid from tank 14 through pipe 15, pump 16 and pipes 153 and 155. The water from header 159 passes to pipes 162 and into the machine, as shown in Figure 4, which is a sectional view on the line 4—4 of Figure 3. The pipes 163 discharge through openings 164 into the channel above division plate 158; the pipe 153 discharges through the perforated bottom 156 of the channel portion and the pipe 155 discharges into the channel beneath partition 158. The weir boxes 12 and 13 regulate the heights of the liquid in the apparatus, respectively, the excess of water flowing through weir box 12 and its discharge pipe to waste, and the excess heavy liquid discharging through weir box 13 and pipe 13 back to the tank 14. The liquid having filled the chamber, the eductors (water impelled injectors) force it to circulate; it travels down the channel to the wheel section of the apparatus. From the wheel section the water travels through pipe 163 back to the eductors 161 and is recirculated. The heavy liquid passes through pipes 165—166 through the eductors 152 and 154 and is recirculated.

H. For the admission of solids to the apparatus there is provided the following structure: 20—20 are channel-shaped guides; 21 is a plate slidably mounted in the guides 20; 22 is a hooded opening in said plate; 23 is a chute in the opening 22.

I. The operation of the apparatus in feeding and separating the solids is as follows: Coal and impurities are fed through chute 23 and opening 22 to the interior of the apparatus; they drop into the moving stream of water which subjects them to a horizontal classification; after they pass through the water stream, they make contact with the layer of heavy liquid, such as a halogenated hydrocarbon, for instance tetrabrom-methane, and are subjected to a combined horizontal and vertical classification; the heavy material, mainly slate, sinks to perforated bottom 156 where it is forced toward the discharge end of the machine by the flow of the current from pipe 155 and is prevented from stopping by the inflow of current through the perforated bottom 156. The coal floats upon the surface of the heavy liquid and the middlings are carried along at various levels therein according to their specific gravities.

J. It is desirable that the middlings shall be separated for further breaking in order to extract coal and that they shall be removed separately from the sinks and the floats. This is accomplished by the following mechanism: 30 is a pivot rod extending transversely of the machine; 31 is a pivot rod extending transversely of the machine; 32 is a movable plate pivoted on rod 30; 33 is a movable plate pivoted on rod 31; 34 is an adjusting and supporting cable attached to the leading edge of plate 32; 35 is an adjusting and supporting cable attached to the leading edge of plate 33; 36 and 37 are bell cranks attached to the cables 34 and 35, respectively; 38 and 39 are hand-operable levers for moving the bell cranks 36 and 37. By manipulating the levers the pivoted plates can be adjusted to include in the middlings greater or less amounts of floating materials and to include more or less or either or both of the light and heavy fractions.

K. The discharging apparatus is a wheel. Referring to the discharge apparatus, 400—401 are bearings; 402 is a motor; 403 is a speed reduction gear; 404 is a driving chain; 405 is a sprocket wheel mounted on shaft 406 which is journaled in the bearings 400—401; 407 is the hub of the wheel; carried by said hub are radial members 408 and concentric members 409—410—411. The interaction of the radial and concentric members forms series of concentric compartments of which the outer series, bounded by the rings 411 and 410 at its lower point, is in position to receive the sunken materials from the bottom of the channel chamber; the intermediate series, bounded by rings 410 and 409, is in position to receive the intermediates; and the upper series, bounded by the ring 409, is in position to receive those materials which float upon the heavy liquid. The radial members 408 are set at an angle so that, as the wheel turns, they offer no substantial resistance to the passage of the fluid. Each compartment has a perforated backpiece 412 which prevents the passage of solids but permits the passage of liquids. The angular placing of the radial members also performs the function of moving the materials which are carried into the compartments to a position in which they will be discharged.

L. The operation of the discharge apparatus is as follows: As the wheel turns the classified materials are passed, the floats over the member 33 and into the section bound by ring 409, the middlings over plate 32, plate 321, and into the compartments bounded by rings 409 and 410, and the sunken materials into the compartments bounded by the ring 411. The liquids which carry the materials pass through the perforated members 412 leaving the solids. As the wheel turns the solids fall down the slope of the angularly placed members 408 to a position in proximity to the discharge opening. The compartments which receive the sinks and the compartments which receive the floats are not otherwise bounded and, as they are turned, the materials would fall out except that members 420 (shown only over the sinks compartments) are placed in close proximity thereto and serve as covers therefor until the discharge chutes 421, 422, and 423 are reached, at which points the loads are emptied, the compartments having been inverted.

M. In Figures 8 and 9 is shown an alternative method of securing the circulation of the liquid. In those figures 170 is an axial flow pump, of the Allis Chalmers or other type, located in the pipe 153 in proximity to the channel; 171 is a shaft for driving the pump; 172 is a bearing for the shaft; 173 is a packing nut and gland; 174 is a gear affixed to the driving shaft 171; 175 is a housing affixed to the apparatus and enclosing the gears; 176 is a shaft mounted in the housing; and 177 is a gear keyed to the shaft 176 and meshing with gear 174. The structure described is for the pump in pipe 155. The numerals 178 indicate a similar structure also driven from the shaft 176 for the pipe 153. 179 is a driving sprocket for furnishing power to shaft 176. It is to be understood that the section of the pipes 153 and 155 will be modified suitably to accommodate the pumps. By the use of this structure the eductors may be eliminated.

N. In Figures 10 and 11 is shown an apparatus to eliminate rafting of the particles which float on the surface of the heavy liquid. In those figures 24 is a plate adjustably mounted by slots 241 and bolts 242 on the plate 21; M is a motor mounted on the plate; 243 is a shaft driven by the motor through the intermediation of any suitable drive 244; 246 are cranks on the shaft 243; 247 are arms pivoted to the ends of the cranks; 248 are slots in the arms operating with pins 249 to give the lower ends of the arms reciprocating motion; 250 are curved perforated plates with projections operating in the surface of the heavy liquid to break up the rafting of floating particles and to assist their transmission by the liquid to the discharge end of the apparatus. The pins 249 are attached to plate 24 preferably, but may be somewhat less desirably attached to any adjacent section of the machine. By this feature an adjustable mechanism is provided for preventing the adhesion of floating particles to the sides of the channel, for the prevention of rafting, and for assisting the motion of floating particles.

O. In Figure 12 is shown another alternative form of the apparatus. In this form the plate 21 bears a motor M and a shaft 260 which through gears 261 drives the shaft 262 which is mounted in the frame 263; 264 is a shaft mounted in the frame 263 driven through gears 265 from the shaft 262; 266 are footed kicker wheels keyed to the shaft 264. When the motor is driven, the kicker wheels are turned and the feet break up any tendency of the particles floating in the heavy liquid to raft and assist the travel of the particles to the discharge end of the apparatus.

P. In Figures 12 and 13 is also shown a modification of the heavy liquid return. In those figures 170 and 171 are outlets from the bottom of the discharge section of the apparatus connecting with a pipe 172 behind an eductor 173; 175 is an endless belt driven by motor M forming the bottom of the channel and serving to discharge the sunken materials into the appropriate compartments of the wheel. By this structure one pipe serves to circulate the heavy liquid and a mechanical means serves to insure the proper delivery of the sunken materials to the discharge apparatus.

Q. In Figures 14 and 15 are shown the co-ordinate means for maintaining the level of the two liquids of the system. In Figure 15, 10 is the channel member, 13 is a weir box; 180 is an opening between the channel and the weir box below the surface of the heavy liquid; 181 is a weir extending across the weir box which will be filled, when first the heavy liquid is put in, to the level of the heavy liquid below the top of the weir. Water will then be run in on top of the heavy liquid raising the level of the heavy liquid until it flows over the weir 181. As the depth of the water increases, the water will flow into weir box 12 which is provided with weir 182 and opening 183. The apparatus is designed so that the weight of heavy liquid behind the weir 181 will balance the weight of water plus heavy liquid when the water is at the level of weir 182. Both openings 183 and 180 are covered with screens to prevent the clogging of the weir box with solid material. Any disturbances in the system will produce a flow of water and heavy liquid over the weirs until it is in proper balance again.

R. In Figures 16 to 22 is shown an alternative form of the invention of exceptional value, the general principles of which are similar to those which have already been described, but which differs in excellent detail. In this form of the invention the water is circulated down channel member 5 to the discharge section 51, flows through the wheel as previously described, is turned by deflectors 52, and flows over weir 53 back through pipes 54 to the upper portion of the channel.

S. The circulation of heavy liquid is through the lower section of the channel and the wheel to the section of the discharge area below the level of the weirs 53. Having been turned by the deflectors 52, the fluid flows back through passageways 540 beneath baffles 541 over weirs 542 beneath the bottom 543 of the channel and into the pipes 544 and 545.

T. The materials carried by the moving liquids are caught by the wheel which is built on the principle hereinbefore described, the sunken materials being caught in the compartments 56, the middlings being caught in the compartments 57, and the floats being caught in the compartments 58. Guards 560, 570, and 580 prevent the discharge of the materials from the compartments before the discharge outlets are reached. When the uppermost position of the compartments is reached, the compartments discharge into discharge chutes 561, 571, and 581, respectively.

U. In the form of the invention the following features of construction are shown: 60 are axial flow pumps within the 4 tubes 54—54—544—545; 61 are motors and driving gear for driving the pumps, here shown to be a belt drive to wheels on the pump shafts; 62 are packing glands and nuts to prevent the escape of fluid through the pump drive shafts; 63 are vanes to reduce turbulence in the fluids; 64 are a series of plates whose outer edges form a type of embankment down which sinking solids find their way impelled by the streams which flow between the plates. In one desirable form of the invention the side plates of the compartment 58 are set at an angle of 47°, side plates of compartment 57 are set at an angle of 55°, and side plates of compartment 56 are set at an angle of 60°.

V. The baffles 541 extend from the wall of the channel to the ends of the weirs 53 and beneath the level of the parting liquid. The weirs 542 extend from the wall of the channel member to the inner side of the discharge tank and upward to a point above the bottom of the baffle.

W. The levels of heavy liquid and of water are maintained in this apparatus in the same way that it is described for the other forms. These overflow devices are suggested at the end wall of the discharge chamber but, since they follow the structure already described, are not shown in full.

X. The apparatuses which have been described are all enclosed and hermetically sealed. The type of hermetical sealing used is illustrated in Figures 3, 5, and 6 wherein a channel member 70 continuous and liquid-tight is provided, which can be filled with suitable liquid. The entire wheel is mounted within the cover which fits within the channel members. The bearings 400 and 401 are fixed to the shaft 406 and are removable with it. The bearings 400 and 401 have flat feet that rest on top of support 71. The weight of the apparatus prevents the bearings from turning with the shaft.

Y. By this invention there is provided a highly practical apparatus for the separation of coal from slate, of middlings from coal and from slate, of other minerals from their impurities, and in general of solids from other solids of different specific gravity.

Z. As many apparently widely different embodiments of this invention may be made without departing from the spirit and scope thereof, it is to be understood that I do not limit myself to the specific embodiments thereof except as defined in the appended claims.

I claim:

1. The process of classifying a mineral-containing, discontinuous mass having particles of different densities which comprises subjecting the mass to the action of a moving stream of water, having depth and velocity sufficient to produce a horizontal classifying effect, and thereafter subjecting the mass in classified relationship to the vertical classifying effect of a stream of heavier, water-immiscible liquid contacting said stream and having a component of motion in the same direction, and having a density between the densities of the said particles.

2. The apparatus comprising an enclosed channel, means for passing a stream of liquid through said channel, means for passing a stream of lighter liquid simultaneously through said channel, means for controlling the depth of a said stream, means for controlling the velocity of a said stream, means to admit a discontinuous mass to said channel, means at a distance from said means of admission to remove said mass from said channel comprising a wheel, radial divisions angularly placed, and concentric divisions therein forming rings of compartments of which an outer ring is in position to receive material from the bottom of said channel, an inner ring is in position to receive floating material, and each compartment is provided with an inward discharge opening, means in each compartment to pass the liquids and retain the solids, means to turn the wheel at a selected rate, means to receive the solids from each compartment and remove them from the apparatus, perforations in the bottom of said channel, means for projecting liquid downstream through said perforations, means to prevent premature discharge of solids from said compartments, and mechanical means to keep floating material in motion.

3. The apparatus comprising an enclosed channel, means for passing a stream of liquid through said channel, means for passing a stream of lighter liquid simultaneously through said channel, means for controlling the depth of a said stream, means for controlling the velocity of a said stream, means to admit a discontinuous mass to said channel, means at a distance from said means of admission to remove said mass from said channel comprising a wheel, radial divisions angularly placed, and concentric divisions therein forming rings of compartments of which an outer ring is in position to receive material from the bottom of said channel, an inner ring is in position to receive floating material, and each compartment is provided with an inward discharge opening, means in each compartment to pass the liquids and retain the solids, means to turn the wheel at a selected rate, means to receive the solids from each compartment and remove them from the apparatus, perforations in the bottom of said channel, and means to move sunken solids downstream.

4. The apparatus comprising an enclosed channel, means for passing a stream of liquid through said channel, means for passing a stream of lighter liquid simultaneously through said channel, means for controlling the depth of a said stream, means for controlling the velocity of a said stream, means to admit a discontinuous mass to said channel, and means at a distance from said means of admission to remove said mass from said channel comprising concentric compartments having means for the escape of liquids and the retention of solids of which an outer series of compartments is in position to receive material from the bottom of said channel, an inner series of compartments is in position to receive floating material and each compartment is provided with an inward discharge opening, means in each compartment to pass the liquids and retain the solids, means to insert and withdraw the compartments from the stream at a selected rate, and means to discharge the solids from each compartment and remove them from the apparatus.

5. The apparatus comprising an enclosed channel, means for passing a stream of liquid through said channel, means for passing a stream of lighter liquid simultaneously through said channel, means for controlling the depth of a said stream, means for controlling the velocity of a said stream, means to admit a discontinuous mass to said channel, and means at a distance from said means of admission to remove said mass from said channel comprising concentric compartments having means for the escape of liquids and the retention of solids, and means to place the said compartments across said stream in a definite zone thereof to receive the discontinuous mass in said stream and to withdraw and empty the said compartments.

6. The apparatus comprising an enclosed channel, means for passing a stream of liquid through said channel, means for controlling the depth of said stream, means for controlling the velocity of said stream, means to admit a discontinuous mass to said channel, and means comprising a wheel having a plurality of concentric series of compartments moving across said stream in different zones thereof at a distance from said means of admission for removing sunken and floating parts of said mass separately from said apparatus, said compartments admitting and retaining solids carried by the stream and admitting and discharging the liquids thereof.

7. The process of classifying a mineral-containing, discontinuous mass containing parts of different specific gravities which comprises plunging the mass into a system comprising a moving stream of liquid having specific gravity intermediate the specific gravities of the said parts, surmounted by a moving stream of lighter, immiscible liquid deep enough and flowing with sufficient velocity to produce a horizontal classifying effect in the mass, and removing the separated parts from the system at a distance from the point of admission.

8. The apparatus comprising an enclosed channel, means for passing a stream of liquid comprising separate light and heavy components through said channel, means for controlling the depth of said stream, means for controlling the velocity of said stream, means to admit a discontinuous mineral mass to said channel, adjustable means at a distance from said means of admission for separating the stratified parts of said mass comprising a series of compartments movable across said stream in a definite zone thereof, said compartments being open upstream and being provided with means to permit the escape of the liquids downstream.

9. In an apparatus for the separation of solids of different specific gravities by means of a liquid of mediate specific gravity, a channel, means to pass a stream of liquid comprising superimposed substantially immiscible bodies of liquid through said channel, means to control the depth of said stream, means to change the velocity of said stream, means to admit a discontinuous mass thereto, and means to remove said discontinuous mass in separate portions from said stream comprising superimposed series of compartments movable across said stream in different zones thereof, said compartments admitting and retaining solid and admitting and discharging liquid constituents of said stream.

10. Means for removing discontinuous solids from a stream of liquid which comprises a channel for the stream, a wheel having its axis parallel to the channel, compartments in the wheel with angularly placed sides, said compartments being open upstream for the reception of liquids and solids, open inwardly for discharge, and being provided downstream with openings for the escape of liquids, and means to rotate the wheel at selected velocity through the channel.

11. In an apparatus of the type described a stream of liquid commingled with solids and means for withdrawing the solids from said stream comprising a series of compartments movable across said stream in a definite zone thereof, said compartments having means to receive the stream and retain the solids thereof, means to withdraw said compartments from the stream, and means to empty said compartments.

12. In an apparatus of the type described a stream of liquid commingled with solids and means for withdrawing the solids from said stream comprising a movable series of compartments through which said stream passes, and having means to retain solids mixed therewith, and means to move said compartments across said stream through a definite zone thereof.

13. In an apparatus means to contain a moving stream comprising superimposed liquids, means to admit a discontinuous mass to said moving stream, and means for separately removing sunken and floating particles from said stream, comprising a compartment permitting escape of the liquid, having sides aligned with the stream at an angle which permits rotation therethrough with minimum interference, and provided with means to extract the solids from the stream, and means to insert said compartment into said stream, move it across said stream in a zone thereof, and remove it therefrom.

14. An enclosed apparatus comprising a channel, means to flow a liquid containing admixed minerals of specific gravities classified by depth therethrough, and means to remove a portion of said classified solids from said channel comprising a compartment permitting the passage of the liquid and having means to retain the solids, means for moving said compartment through a transverse zone of said channel at intervals, whereby to gather the solids in the said zone, and means for emptying said compartment.

15. Means for removing classified minerals from a channel containing a moving liquid containing the minerals which comprises a wheel of diameter greater than the channel having an axis parallel to the channel and having compartments aligned with the channel for the reception of the solids, and means for turning the wheel.

16. In apparatus for the separation of minerals involving a channel and a carrier stream therein of specific gravity less than that of certain mineral components to be classified thereby, means for moving the said heavy minerals with the stream which comprises means for admitting a part of said stream in the upper part of said channel, and means for admitting a part thereof to said channel through the bottom of said channel, said bottom being inclined to assist the motion of the sunken solids, and having a series of orifices to direct the lower part of said stream therethrough and against said solids.

FRANK E. SMITH.